US011150405B2

(12) United States Patent
Quinlan

(10) Patent No.: US 11,150,405 B2
(45) Date of Patent: Oct. 19, 2021

(54) APPARATUSES AND METHODS FOR PHOTONIC COMMUNICATION AND PHOTONIC ADDRESSING

(71) Applicant: MICRON TECHNOLOGY, INC., Boise, ID (US)

(72) Inventor: Sion Quinlan, Reading (GB)

(73) Assignee: Micron Technology, Inc., Boise, ID (US)

( * ) Notice: Subject to any disclaimer, the term of this patent is extended or adjusted under 35 U.S.C. 154(b) by 16 days.

(21) Appl. No.: 16/366,713

(22) Filed: Mar. 27, 2019

(65) Prior Publication Data

US 2019/0219763 A1 Jul. 18, 2019

Related U.S. Application Data

(63) Continuation of application No. 15/859,106, filed on Dec. 29, 2017, now Pat. No. 10,274,675, which is a
(Continued)

(51) Int. Cl.
*G02B 6/12* (2006.01)
*H04B 10/80* (2013.01)
(Continued)

(52) U.S. Cl.
CPC ..... *G02B 6/12004* (2013.01); *G02B 6/12002* (2013.01); *G02B 6/2938* (2013.01);
(Continued)

(58) Field of Classification Search
None
See application file for complete search history.

(56) References Cited

U.S. PATENT DOCUMENTS 6,343,171 B1 1/2002 Yoshimura et al.
6,983,092 B2 1/2006 Kondo
(Continued)

FOREIGN PATENT DOCUMENTS

CN 101589318 A 11/2009
CN 101910897 A 12/2010
(Continued)

OTHER PUBLICATIONS

Extended European Search Report for EP. Application No. 17753670.3, dated Sep. 23, 2019.
(Continued)

*Primary Examiner* — Ryan A Lepisto
*Assistant Examiner* — Erin D Chiem
(74) *Attorney, Agent, or Firm* — Dorsey & Whitney LLP

(57) ABSTRACT

Apparatuses and methods for photonic communication and photonic addressing are disclosed herein. An example apparatus includes a plurality of photonic sources, a plurality of memory die, a logic die. Each of the plurality of photonic sources provides a photonic signal of a different wavelength and are provided to a first photonic path. Each memory die of the plurality of memory die includes a photonic modulation circuit coupled to the first photonic path, and further includes a photonic detector circuit coupled to a second photonic path. Each memory die of the plurality of memory die is associated with and addressed by a respective wavelength of a photonic signal. The logic die is coupled to the first and second photonic paths, and includes a plurality of photonic circuits. Each of the photonic circuits of the plurality of photonic circuits is associated with a respective wavelength of a photonic signal.

15 Claims, 5 Drawing Sheets

Related U.S. Application Data continuation of application No. 15/617,993, filed on Jun. 8, 2017, now Pat. No. 9,885,827, which is a continuation of application No. 15/046,949, filed on Feb. 18, 2016, now Pat. No. 9,739,939.

(51) Int. Cl.
*G02B 6/293* (2006.01)
*H04B 10/516* (2013.01)
*H04B 10/50* (2013.01)
*H04B 10/25* (2013.01)

(52) U.S. Cl.
CPC ....... *G02B 6/29362* (2013.01); *H04B 10/801* (2013.01); *G02B 2006/12109* (2013.01); *G02B 2006/12121* (2013.01); *G02B 2006/12123* (2013.01); *G02B 2006/12142* (2013.01); *H04B 10/501* (2013.01); *H04B 10/516* (2013.01)

(56) References Cited

U.S. PATENT DOCUMENTS

| | | | |
|---|---|---|---|
| 7,119,321 | B2 | 10/2006 | Quinlan |
| 7,915,699 | B2 | 3/2011 | Krishnamoorthy et al. |
| 8,536,512 | B2 | 9/2013 | Shiraishi |
| 8,980,727 | B1 | 3/2015 | Lei et al. |
| 9,094,135 | B2 * | 7/2015 | Pelley .................. H04B 10/801 |
| 9,235,001 | B2 | 1/2016 | Sekiguchi et al. |
| 9,297,971 | B2 | 3/2016 | Thacker et al. |
| 9,583,912 | B2 * | 2/2017 | Chou .................. H01S 3/0057 |
| 9,739,939 | B1 | 8/2017 | Quinlan |
| 9,766,409 | B2 * | 9/2017 | Pelley .................. G02B 6/3562 |
| 9,885,827 | B2 | 2/2018 | Quinlan |
| 2001/0026668 | A1 | 10/2001 | Yamada |
| 2004/0047538 | A1 | 3/2004 | Howland et al. |
| 2004/0264867 | A1 | 12/2004 | Kondo |
| 2008/0246106 | A1 * | 10/2008 | Beausoleil ............. B82Y 20/00 257/432 |
| 2010/0226657 | A1 | 9/2010 | Raymond et al. |
| 2010/0266295 | A1 | 10/2010 | Zheng et al. |
| 2011/0091157 | A1 | 4/2011 | Yao et al. |
| 2014/0281199 | A1 | 9/2014 | Baker et al. |
| 2014/0363172 | A1 | 12/2014 | Pelley et al. |
| 2016/0034371 | A1 | 2/2016 | Oh et al. |
| 2016/0056171 | A1 | 2/2016 | Manorotkul et al. |
| 2017/0242190 | A1 | 8/2017 | Quinlan |
| 2017/0269299 | A1 | 9/2017 | Quinlan |
| 2018/0120505 | A1 | 5/2018 | Quinlan |

FOREIGN PATENT DOCUMENTS

| | | |
|---|---|---|
| CN | 103580751 A | 2/2014 |
| EP | 2203768 A1 | 7/2010 |
| JP | 05114909 A | 5/1993 |
| JP | 05130048 A | 5/1993 |
| JP | 2013250436 A | 12/2013 |
| JP | 2014035546 A | 2/2014 |
| JP | 2014038155 A | 2/2014 |
| KR | 1020090127047 A | 12/2009 |
| KR | 1020120089895 A | 8/2012 |
| WO | 2005038514 A2 | 4/2005 |
| WO | 2017142811 A2 | 8/2017 |

OTHER PUBLICATIONS

Beausoleil, Raymond G. et al., "Large-Scale Integrated Photonics for High-Performance Interconnects", ACM Journal on Emerging Technologies in Computing Systems, vol. 7, No. 2, Article 6, May 2011.

Ophir, Noam et al., "Silicon Photoni Microring Links for High-Bandwidth-Density, Low-Power Chip I/O", IEEE Computer Society, vol. 33, No. 1, pp. 54-67, Jan. 2013.

Translation of KR OA dated Nov. 13, 2019 for KR Application No. 10-2018-7026853, 1 pg.

First Office Action received for TW Application No. 106105447, dated Mar. 19, 2018, pp. all.

Receipt of International Search Report for PCT/US2017/017460 dated May 16, 2017, pp. all.

English translation of Office Action for CN Application No. 201780012210.4, dated Jul. 31, 2020.

* cited by examiner

APPARATUSES AND METHODS FOR PHOTONIC COMMUNICATION AND PHOTONIC ADDRESSING

CROSS-REFERENCE TO RELATED APPLICATIONS

This application is a continuation of U.S. patent application Ser. No. 15/859,106 filed Dec. 29, 2017 and issued as U.S. Pat. No. 10,274,675 on Apr. 30, 2019, which is a continuation of U.S. patent application Ser. No. 15/617,993, filed Jun. 8 2017 and issued as U.S. Pat. No. 9,885,827 on Feb. 6, 2018, which is a continuation of U.S. patent application Ser. No. 15/046,949, filed Feb. 18, 2016 and issued as U.S. Pat. No. 9,739,939 on Aug. 22, 2017. These applications and patents are incorporated by reference herein in their entirety and for all purposes.

BACKGROUND

Packaged semiconductor devices that include multiple semiconductor die may require high internal data rates to meet current and future trends in operating speeds. While standard data transmission techniques may still provide future increases to data rates, the currently available increases may be limited by the physical components of the die and interconnect materials. For example, electrical connections formed between die may limit the signals provided thereon and may also limit the achievable data rate. Accordingly, alternative communication techniques may be desirable.

DETAILED DESCRIPTION

Figure 1:
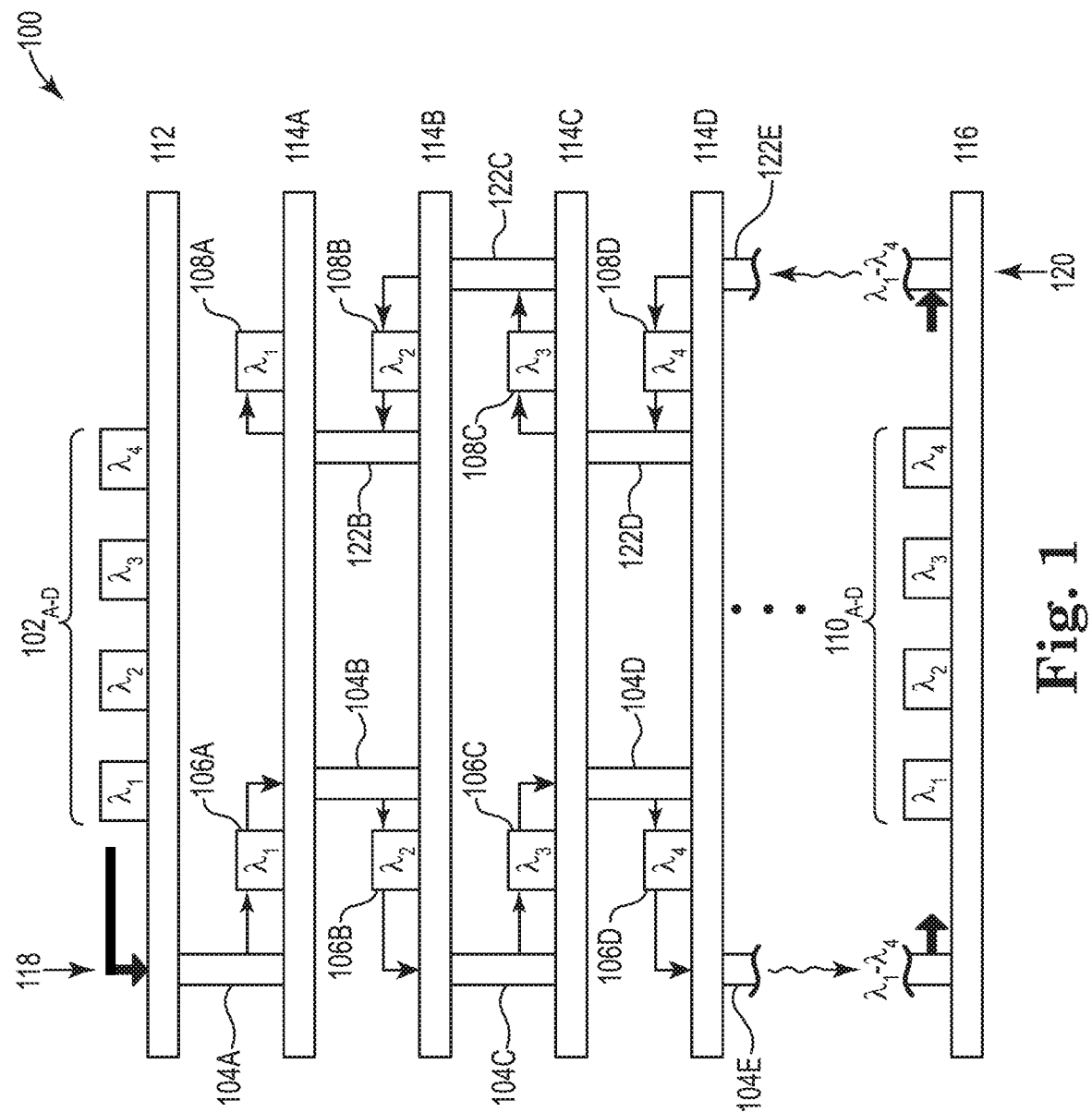
FIG. 1 is a block diagram of an apparatus in accordance with an embodiment of the present disclosure.

Apparatuses and methods for photonic communication and photonic addressing are disclosed herein. Embodiments of the disclosure provide examples of transmitting and receiving packets within a packaged semiconductor device having multiple semiconductor die using photonic-based signals and further using a characteristic of the signals to address individual die of the device. For example, a memory device that includes a stack of memory die may include a respective number of photonic sources as there are memory die, and the wavelength of each respective photonic source may be used to indicate a memory die that a packet is provided to or received from. Certain details are set forth below to provide a sufficient understanding of embodiments of the disclosure. However, it will be clear to one skilled in the art that embodiments of the disclosure may be practiced without various aspects of these particular details. In some instances, well-known device components, circuits, control signals, timing protocols, and software operations have not been shown in detail in order to avoid unnecessarily obscuring the described embodiments of the disclosure.

Data transmission rates are increasing in step with electronic performance of semiconductor-based electronic devices. However, higher data rates may incur various problems when standard electrical signals, e.g., electrical pulses propagating through a conductive trace, are used. For example, most electronic circuits, ICs for example, are small and include various signal pathways that typically carry large amounts of fast moving electrical signals. The fast moving electrical signals may create cross-talk, simultaneous switching noise, and interference problems, to name a few potential problems. These problems may be compounded in devices that include multiple interconnected semiconductor die that move lots of data from die to die. Additionally, the high data rates and, more specifically the electronic circuits driving the data rates, may require high power levels, which may generate excess heat.

Data rates within interconnected semiconductor die may be limited by the physical interconnects, e.g., electrical traces that provide the connection, among other limiting factors. One way the physical pathways limit data rates may be due to the limited amount of information that can be transmitted through the electrical traces at any given time. While frequency modulation, for example, of the electrical signals may allow simultaneous transmission of different information, e.g., packets of information, the circuits for driving and detecting the electrical signals at the various frequencies may be energy inefficient. As such, it may be desirable to transmit multiple, different packets of information within a number of interconnected semiconductor die that limits energy consumption while providing high data rates.

One solution may be to provide photonic communication paths between a number of interconnected semiconductor die. The interconnected die may be included in a single package in some examples. The photonic communication paths may include one or more photonic sources that each provides photonic signals of different wavelengths. Each of the different wavelengths may be associated with a single die of the interconnected die so that the wavelength operates as an address for a respective die. For example, a memory device that includes a plurality of interconnected memory die may address each of the plurality of memory die using a photonic signal of a different wavelength. The example memory device may also include a logic layer to receive and provide photonic signals of each wavelength, and an included photonic layer may provide a photonic signal of each wavelength.

FIG. 1 is a block diagram of an apparatus 100 in accordance with an embodiment of the present disclosure. The apparatus 100 may be an electronic device that includes a number of interconnected semiconductor die. While the disclosure is not limited to a specific type of electronic device, for purposes of illustration the disclosure will be discussed using a memory device as an example, but the memory device should not be taken as limiting. In general, however, the apparatus 100 may be any electronic device that includes multiple interconnected die disposed in a single package. The apparatus 100 may include photonic communication paths that allow for the transmission of packets, e.g., packets that include information such as data, command, address, clock, and combinations thereof, between various die of the apparatus 100. The apparatus 100 may use a characteristic of the photonic signal transmitted therein to indicate, e.g., address, which interconnected die of at least each of a subset of the interconnected die being provided or providing data and/or command packets. For example, each of several die may be associated with a photonic signal of a specific wavelength and their associated wavelength may be used to address respective die, and to indicate a source of a packet. Accordingly, packets may be transmitted using a photonic signal of a wavelength that indicates either a target die that is to receive a packet, and/or a packet may be transmitted by a die where the wavelength of the photonic signal of the packet indicates the origin of the packet. A logic die, which may be a system on a chip or a memory controller for example, may receive packets from and transmit packets to one or more of the other die of the apparatus 100. The apparatus 100 may additionally include a source for each photonic signal.

The apparatus 100 includes a layer 112, a plurality of layers 114, such as layers 114A through 114D, and a layer 116. Each of the layers 112, 114, and 116 may be separate, individual semiconductor die formed into a die stack, for example. The individual die of the stack may be physically coupled to one or more adjacent die. Additionally, the die of the die stack may be electrically and optically coupled as will be discussed herein. As used herein, the term "layer" refers to individual semiconductor die. While FIG. 1 depicts the apparatus as including a stack of die, other arrangements, such as an in-plane, also fall within the scope of the present disclosure. Each of the layers 112, 114, and 116 may provide one or more operations for the apparatus 100. The respective operation of each layer is a non-limiting aspect of the present disclosure. In some embodiments, the apparatus 100 may be a memory device that includes a logic die, a plurality of memory die, and a photonic source layer. For example, layer 112 may be a photonic source layer, layer 116 may be a logic die, and layers 114A through 114D may each be a memory die.

Each layer of the apparatus 100 may at least be coupled to adjacent layers by one or more of a plurality of photonic through substrate vias (PTSVs) 104 and 122. Layers 114A through 114D may each include a photonic filter/modulator circuit 106, and a photonic filter/detector circuit 108. Layer 112 may include a plurality of photonic sources 102, such as photonic sources 102A through 102D, with each of the plurality of photonic sources providing a photonic signal of a different wavelength. Layer 116 may include, among other things, a plurality of photonic circuits 110, such as photonic circuits 110A through 110D. Each of the plurality of photonic circuits 110 may be associated with a corresponding one of the plurality of layers 112 based on a corresponding wavelength.

Each of the plurality of PTSVs 104, 122 may be disposed between adjacent layers of the apparatus 100, and the plurality of PTSVs 104, 122 may form two separate photonic communication paths, such as a down path 118 and an up path 120. For example, the down path 118 may be associated with, e.g., formed by, the plurality of PTSVs 104A through 104E, and the up path 120 may be associated with, e.g., formed by, the plurality of PTSVs 122B through 122E. While no PTSV 122 is shown between layer 112 and 114A, a PTSV 122A may be included between these two layers in some embodiments. Further, the PTSVs 104, 122 included in each communication path may be offset from one another so that each of the layers 114, for example, may have access to, e.g., receive photonic signals from and provide photonic signals to, their respective PTSVs 104, 122 coupled thereto. Further each layer 112, 114 and 116 may be characterized as having an inbound and an outbound PTSV, and, as used herein, an "inbound PTSV" may be the PTSV by which the photonic signals arrive at a layer, and an "outbound PTSV" may be the PTSV by which the photonic signals leave a layer. For example, in the down path 118, the layer 114A may receive photonic signals at a filter/modulator circuit 106A from an inbound PTSV 104A, which is coupled between layer 112 and 114A. The layer 114A may further provide photonic signals to an outbound PTSV 104B, which may be coupled between the layers 114A and 114B. For the up path 120, an inbound PTSV 122 for a given layer may be coupled to a layer directly below it, and an outbound PTSV 122 may be coupled to a layer directly above it. Each PTSV 104, 122 may be configured as a waveguide as is known in the art, e.g., a multi-layer structure that confines photonic signals due to differences in the refractive index between the different layers of the structure. Examples of PTSVs may be found in U.S. Pat. No. 7,119,321, which is incorporated herein for all purposes.

In some embodiments, the down path 118 may be the photonic communication path over which unmodulated photonic signals are provided to each of the layers 114 by the layer 112. Further, each of the layers 114A through 114D may be able to modulate a photonic signal of a respective wavelength and provide the modulated photonic signal to the down path 118. A modulated photonic signal provided by the layer 114A, for example, may propagate through each subsequent layer in the down path 118 before arriving at the layer 116. The wavelength of the modulated photonic signal provided by the layer 114A may indicate to the layer 116 the source of the modulated photonic signal. In general, the down path 118 may simultaneously include photonic signals of all wavelengths of the apparatus 100, e.g., wavelengths $\lambda 1$ through $\lambda 4$, propagating therein in either a modulated or unmodulated state, where the modulated signals may provide information other than the wavelength of the photonic signal.

In some embodiments, the up path 120 may be the photonic communication path over which layer 116 provides modulated photonic signals, to each of the layers 114A through 114D. For example, layer 116 may provide a modulated photonic signal to the layer 114A by way of the up path 120. Layer 116 may address the command packet for layer 114A by using a photonic signal of the wavelength associated with layer 114A. The layer 116 may receive an unmodulated photonic signal of a wavelength associated with layer 114A from the down path 118, modulate the photonic signal, and provide, e.g., transmit, the modulated photonic signal to layer 114A by way of the up path 120. On the way to layer 114A, the packet may propagate through each of the intervening layers 114D through 114B. The photonic signals provided to the up path may originate from the layer 112, and may be redirected to the up path 120 by the layer 116. In general, photonic signals of all wavelengths of the apparatus 100, e.g., wavelengths $\lambda 1$ through $\lambda 4$, may simultaneously be propagating the up path 120 in either a modulated or an unmodulated state.

While both the down path 118 and the up path 120 may include modulated photonic signals, which may also be referred to as packets, unmodulated photonic signals of all wavelengths may be traversing both the down path 118 and the up path 120 at any given moment of operation of the apparatus 100. In general, photonic signals may be modulated when commands and/or data are to be provided by the layer 116 and a layer 114, respectively, else the photonic signals may be traversing both the up path 118 and the down path 120 in an unmodulated state.

Layer 112, e.g., the photonic source layer, may include a plurality of photonic sources 102A through 102B. While only four photonic sources are shown, the number of photonic sources included in the layer 112 is not limited, and N photonic sources may be included for apparatuses that include N layers, not counting the layer 116. Each photonic source 102 may provide a photonic signal of a different wavelength. Additionally, the wavelength of each of the plurality of photonic sources 102 may be offset from the other wavelengths so that the photonic signals may be filtered based on wavelength. Further, each photonic source 102 may correspond to one of the layers 114A through 114D by associating the wavelength of the photonic source with a layer. Stated another way, each layer 114 may be tuned to an associated wavelength provided by a corresponding photonic source 102. As such, outside of layers 112 and 116, each layer may be associated with a specific wavelength so that each of those layers may be addressed based on their respective wavelength. For example, photonic source 102A may provide a photonic signal having a wavelength of $\lambda 1$, which may be associated with, e.g., assigned to, layer 114A. Photonic source 102B may provide a photonic signal having a wavelength of $\lambda 2$ which may be assigned to layer 114B, and so on. Each photonic source 102 may provide their respective photonic signals to the down path 118. In some embodiments, the photonic signals from each of the photonic sources 102 may be simultaneously and continuously provided to the down path 118. Additionally, the photonic signals provided by layer 112 may be in a virgin state, e.g., unmodulated, such that no information, other than the wavelength of each photonic signal, is provided by layer 112.

Each layer 114 may be coupled to adjacent layer by PTSVs 104 of the down path 118, and by PTSVs 122 of the up path 120. Each layer 114 may be coupled to their respective PTSVs 104, 122 by one or more surface couplers (not shown), to be discussed in detail below. The surface couplers may extract the photonic signals of all wavelengths from an inbound PTSV and provide the extracted photonic signals to a photonic circuit, such as a photonic filter/detector circuit 108 or a photonic filter/modulator circuit 106. Photonic signals may then be coupled to an outbound PTSV by a respective surface coupler. While surface couplers are discussed in the present disclosure, surface couplers are a non-limiting aspect of the present disclosure and any known photonic coupling device now known or developed in the future is contemplated. In general, the photonic signals are provided from and to the PTSVs at each layer 112, 114, and 116 so that the corresponding photonic circuits receive the photonic signals.

Layers 114A through 114D may perform desired operations based on commands provided by the layer 116. For example, each of the layers 114A through 114D may be a memory die, such as volatile or non-volatile memory, which store and provide data responsive to commands received from the layer 116. For providing packets, e.g., read data packets, each of the plurality of layers 114 may include a photonic filter/modulator circuit 106 for filtering and modulating a photonic signal of a respective wavelength, where the modulated photonic signal is the packet. For receiving packets, e.g., command packets, each of the plurality of layers 114 may include a photonic filter/detector circuit 108 for filtering and receiving a modulated photonic signal of a respective wavelength, where the modulated photonic signal is the packet. The photonic filter/modulator circuits 106 may be associated with the down path 118, and the photonic filter/detector circuits 108 may be associated with the up path 120. Accordingly, each layer 114 may be able to at least filter, modulate, and detect, photonic signals of a respective wavelength. Additionally, each layer may also provide photonic signals to a subsequent layer, the subsequent layer being different in the down path 118 than in the up path 120.

Each photonic filter/modulator circuit 106 may receive photonic signals of all wavelengths from an inbound PTSV 104 and filter a photonic signal of the respective wavelength. The filtered photonic signal of the respective wavelength may be provided to a photonic modulator. The photonic modulator may modulate the photonic signal based on an input signal and provide the modulated photonic signal to an outbound PTSV 104. The modulated photonic signal may be a packet that is provided to the layer 116. The packet may include read data, for example. So that the layer 116 knows to expect a packet, the providing layer 114 may send an alert signal instructing the layer 116 to begin monitoring for the packet. The alert signal may be a modulated photonic signal of a respective wavelength or it may be an electrical signal provided to the layer 116 by an electrical connection (not shown). In some embodiments, a handshake may be performed between a layer 114 and the layer 116 to alert the receiving layer that data is forthcoming.

Further, each layer 114 and 116 may receive, and pass along, each photonic signal provided by the layer 112. For example, in the down path 118 the layer 114A may receive photonic signals of each wavelength) $\lambda 1$ through $\lambda 4$ in an unmodulated state, and pass the same along to the layer 114B by way of the down path 118. Additionally, each layer 114A through 114D along the down path 118 may be able to modulate and provide, e.g., transmit, a modulated photonic signal of their respective wavelength. The modulated photonic signals may, for example, be packets of read data or a confirmation flag indicating the performance of a received command. Commands may be received from the up path 120, for example.

Each photonic filter/detector circuit 108 may receive photonic signals from an inbound PTSV 122 and provide the photonic signals to a photonic filter. The photonic signals received by any one layer 114 in the up path 120 may depend on the location of the layer 114. For example, the layer 114D may receive photonic signals of all wavelengths, whereas the layer 114A may only receive a photonic signal of its associated wavelength. The photonic filter of each layer may be tuned to filter the photonic signal of the respective wavelength. The photonic detector may be a photonic-to-electrical converter that receives the photonic signal of the respective wavelength and converts the photonic signal to a corresponding electrical signal when the photonic signal is modulated. Modulated photonic signals may be a packet of information, such as a command packet that includes a command, an address, and data. In some examples, a clock signal may be embedded into the serialized packet. In some embodiments, the clock signal may be provided separately, and provided either optically or electrically. Unmodulated photonic signals received by each photonic filter/detector circuit 108 may be ignored and terminate at their respective layer.

In general, the photonic signals of each wavelength may be continuously provided to the down path 118 and to the up path 120 through the layers 114. The photonic signals may be modulated as needed to either provide a command packet from the layer 116 to one or more of the layers 114, or simultaneously to all of those layers. Additionally, the photonic signals may be modulated to provide a data packet from one or all of the layers 114 to the layer 116. Packets provided in the down path 118 and the up path 120 may be provided simultaneously in both directions, and each layer 114 may provide and receive packets simultaneously.

Layer 116 may be coupled to the plurality of layers 114 through the inbound PTSV 104E and the outbound PTSV 122E, and the layer 116 may include the plurality of photonic circuits 110. Each of the plurality of photonic circuits 110 may include a photonic filter, a photonic detector, and a photonic modulator, for example. As used herein, the term "photonic circuit" may include photonic components, photonic-to-electrical converters, and electrical components. Each of the plurality of photonic circuits 110 may correspond to a specific wavelength so that there may be a photonic circuit 110 associated with each layer 114 based on a respective wavelength. Further, each photonic circuit 110 may be capable of receiving the photonic signals from the inbound PTSV 104E of the down path 118, filter a photonic signal of a respective wavelength, and then detect or modulate the photonic signal of the respective wavelength. Whether the photonic signals are detected or modulated (or possibly ignored) by the layer 116 may depend on external commands received by the layer 116. When the photonic signals are modulated to provide a command packet to one of the layers 114, for example, the modulated photonic signal may be provided to the outbound PTSV 122 by the photonic circuit 110.

The layer 116 may receive external commands provided by a host, for example, and provide responses to the host based on the received external commands. For example, a write command received by the layer 116 may be converted into a packet that is provided to a target layer 114 by way of the up path 120. To alert a layer 114 to monitor for a packet, layer 116 may provide a photonic signal or an electrical signal informing the target layer 114 to expect a packet. In some embodiments, a handshake process may occur when layer 116 provides a command packet to a layer 114. In response to a read command, for example, one of the layers 114 may provide a packet of read data to the layer 116. Layer 116 may detect the packet of read data, convert it to electrical signals, and provide the electrical signals to a requesting host, for example.

In operation, the layer 116 may receive an external command from an external host, such as a read command or a write command. The layer 116 may then determine which of the layers 114 to direct the external command, e.g., which layer to target, based on address information included in the received external command. The layer 116 may then modulate a photonic signal of the wavelength associated with the target layer 114 and provide the modulated photonic signal to the target layer by way of the up path 120. For example, a write command including address information and data may be received by the layer 116. Layer 116 may determine the write command is directed toward layer 114B, which may be addressed with the photonic wavelength $\lambda 2$. Layer 116 may then provide electrical signals to the photonic circuit 110B, which modulates the photonic signal of wavelength $\lambda 2$ to encode the write command into a modulated photonic signal, and provide the modulated signal to the up path 120. Layer 116 may also provide the layer 114B with a signal directed to alert the layer 114B of the incoming modulated photonic signal prior.

In response, the photonic filter/detector circuit 108B may filter out the modulated photonic signal of wavelength $\lambda 2$ and detect the information, such as the command type, address to write the data, and the data. Additionally, if a clock signal is imbedded in the command packet, the layer 114B may implement known clock recovery techniques to recover the clock signal. Subsequent to performing the write command, layer 114B may modulate the photonic signal of wavelength $\lambda 2$ with the photonic filter/modulator circuit 106B to generate a confirmation flag, for example. The confirmation flag may be provided to the layer 116 by way of the down path 118.

While the operation was discussed with regards to a single layer 114, it should be understood that the layer 116 may provide commands to all layers 114 simultaneously. Accordingly, the capability of transmitting in all wavelengths at once allows for the layer 116 to communicate with each layer 114 in parallel, which increases the data rate of the apparatus 100. Additionally, using photonic signals to provide a communication medium within the apparatus 100, the apparatus 100 may consume less power and generate less heat. These advantages may be due to the photonic sources being low power photonic sources.

Figure 2:
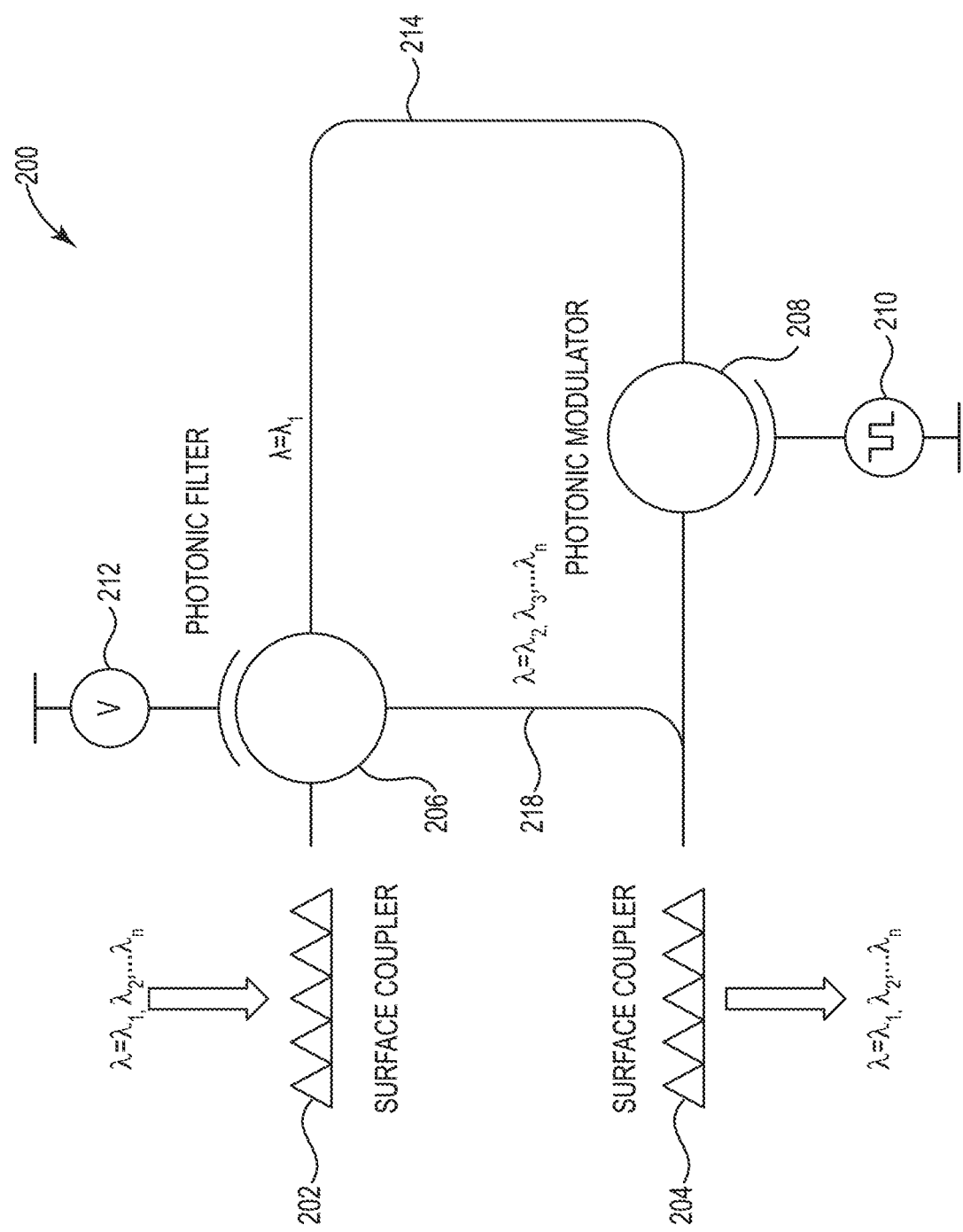
FIG. 2 is an illustration of a transmit side of a layer in accordance with an embodiment of the present disclosure.

FIG. 2 is an illustration of a transmit side of a layer 200 in accordance with an embodiment of the present disclosure. The transmit side of the layer 200 may be an example of the down path 118 and associated photonic filter/modulator circuits 106 of each layer 114 of FIG. 1. The transmit side of the layer 200 may include a surface coupler 202, a surface coupler 204, a photonic filter 206, and a photonic modulator 208. The transmit side of the layer 200 may receive photonic signals of wavelengths 1 through n, filter one of the received wavelengths, potentially modulate the photonic signal of the filtered wavelength, and provide the photonic signal of the filtered wavelength, modulated or not, along with the photonic signals of the remaining wavelengths. In general, photonic signals of wavelengths that are not filtered by the filter 206 may pass unaffected through the transmit side of the layer 200.

The surface couplers 202 and 204 may be arranged to be at a receive side and a transmit side of the layer 200. Each surface coupler 202, 204 may be coupled to a separate PTSVs (not shown). For example, the surface coupler 202 may be at a bottom side of an inbound PTSV, such as the PTSV 104A in the down path 118 of FIG. 1, and the surface coupler 204 may be at a top side of an outbound PTSV, such as the PTSV 104B in the down path 118. In general, the surface couplers 202, 204 may couple the photonic signals to and from the respective PTSVs. Accordingly, the surface coupler 202 may couple photonic signals of all wavelengths from a PTSV to the photonic filter 206, and the surface coupler 204 may couple photonic signals of all wavelengths from the photonic modulator 208 and the path 218 to a PTSV. The path 218 may be a photonic waveguide disposed on a layer, such as one of the layers 114, which may provide a path for the photonic signals to take between the surface couplers 202 and 204.

The photonic filter 206 may receive the photonic signals of all wavelengths 1 through n from the surface coupler 202, and filter the photonic signal of a select wavelength, wavelength 1 for example. The other wavelengths 2 through n that are not filtered by the photonic filter 206 may either be in a modulated or umnodulated state. The filtered photonic signal of wavelength 1 may be provided to the photonic modulator 208 by the path 214, which may be a waveguide formed on a surface of the layer 200. The unfiltered photonic signals, e.g., the remaining photonic signals of wavelengths 2 through n, may be provided to the surface coupler 204 through the path 218. The photonic filter 206 may be tuned based on a voltage provided by voltage source 212. Tuning the photonic filter 212 may allow a photonic signal of a desired wavelength out of wavelengths 1 through n to be filtered from the photonic signals, such as wavelength 1. With regards to FIG. 1, because each photonic filter/modulator circuit 106 is included in a different layer 114 and may filter a different wavelength, the voltage sources of each layer 114 may provide a different voltage so that each photonic filter/modulator 106 filters a respective wavelength.

The photonic modulator 208 may modulate the photonic signal of wavelength 1 to provide a data packet formed by a modulated photonic signal of wavelength 1, which may be read data for example. The photonic modulator 208 may modulate the photonic signal in response to an electrical signal provided by a driver circuit 210. The driver circuit 210 may receive electrical signals from circuits of the layer 200, such as output driver circuits for example. The modulation of the photonic signal of wavelength 1 may provide transmission of a serialized data packet.

Figure 3:
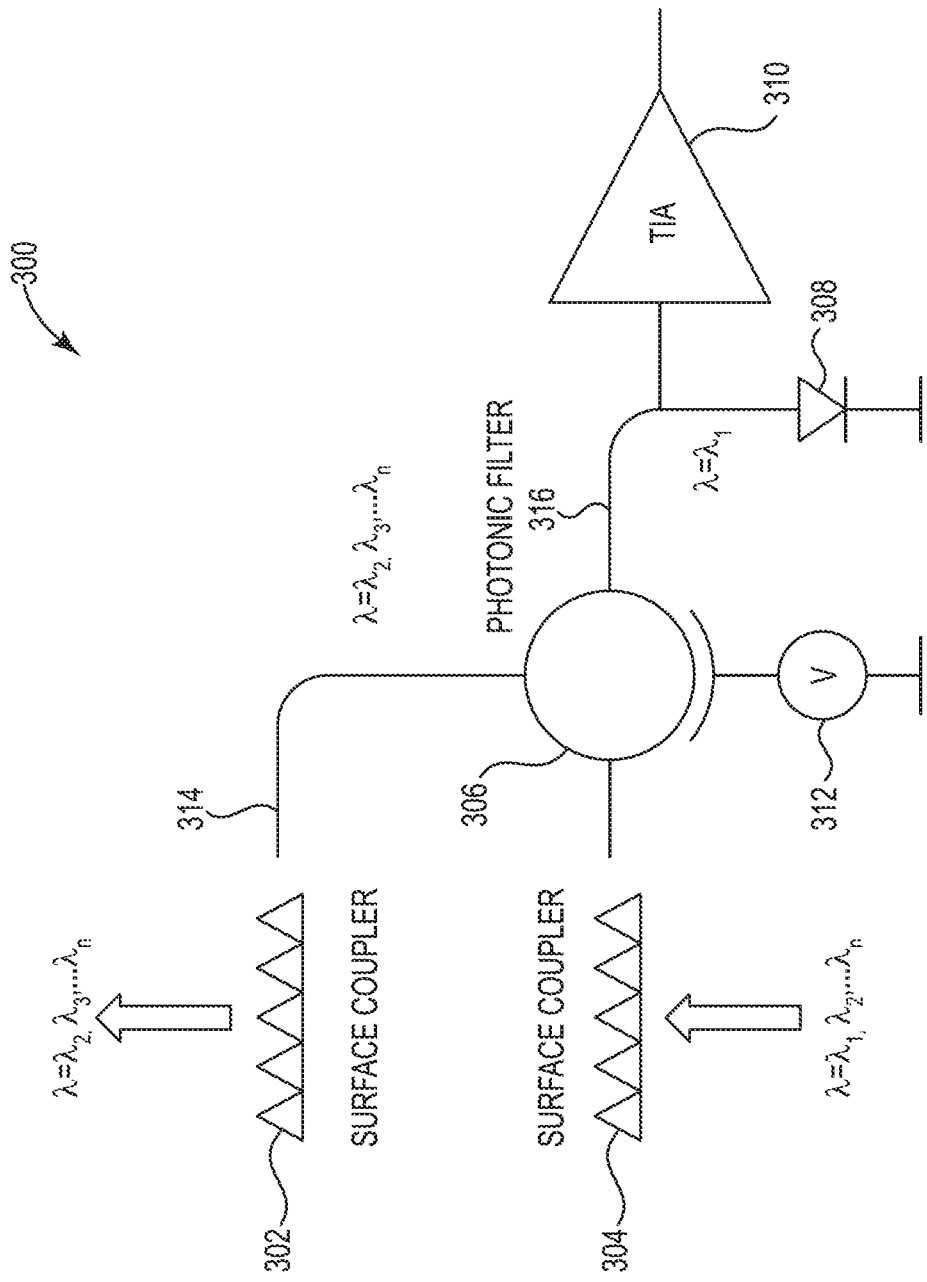
FIG. 3 is an illustration of a receive side of a layer in accordance with an embodiment of the present disclosure.

FIG. 3 is an illustration of a receive side of a layer 300 in accordance with an embodiment of the present disclosure. The receive side of the layer 300 may be an example of the up path 120 and associated photonic filter/detector circuits 108 of each layer 114 of FIG. 1. The receive side of the layer 300 may include surface couplers 302 and 304, photonic filter 306, photodiode 308 and a transimpedance amplifier (TIA) 310. The receive side of the layer 300 may receive photonic signals of wavelengths 1 through n in either a modulated or an unmodulated state, allow photonic signals of wavelengths not filtered by the photonic filter 306 to pass through, and detect the photonic signal of the wavelength the photonic filter 306 is tuned to filter. If the filtered photonic signal is modulated, then the photodiode 308 in combination with the TIA 310 may detect and provide electrical signals in response. If, however, the filtered wavelength is not modulated, then the filtered photonic signal may terminate at the layer 300.

The surface couplers 302 and 304 extract and couple the photonic signals from and to respective PTSVs, and may be characterized similarly to the surface couplers 202, 204 of FIG. 2. Accordingly, the surface coupler 302 may extract the photonic signals of all wavelengths from an inbound PTSV and couple the photonic signals to the photonic filter 306, and the surface coupler 304 may couple photonic signals of wavelengths not filtered by the photonic filter 306 to an outbound PTSV. For example, the surface coupler 304 may be coupled to the inbound PTSV 122E of FIG. 1, and provide photonic signals of all wavelengths received to the photonic filter 306. Conversely, the surface coupler 302 may receive photonic signals of wavelengths not filtered by the photonic filter 306 and provide the same to the outbound PTSV 122D.

The photonic filter 306 may be tuned to filter, e.g., select, a photonic signal of a desired wavelength based on a voltage provided by voltage source 312. With regards to FIG. 1, because each photonic filter/detector circuit 108 is included in a different layer 114 and may filter a different wavelength, the voltage sources of each layer 114 may provide a different voltage so that each photonic filter/detector 108 filters a respective wavelength. The filtered photonic signal may be provided to the photodiode 308 via the path 316. The photodiode 308 may detect the photonic signal and convert the photonic signal to electrical signals as known in the art. The corresponding electrical signals may subsequently be amplified by the TIA 310. The amplified electrical signals may be provided to electrical circuits (not shown) of the layer 300.

In general, the receive side of the layer 300 provides a through path for photonic signals of wavelengths not associated with the layer 300, but provides the photonic and electrical components for filtering and detecting photonic signals of an associated wavelength.

Figure 4:
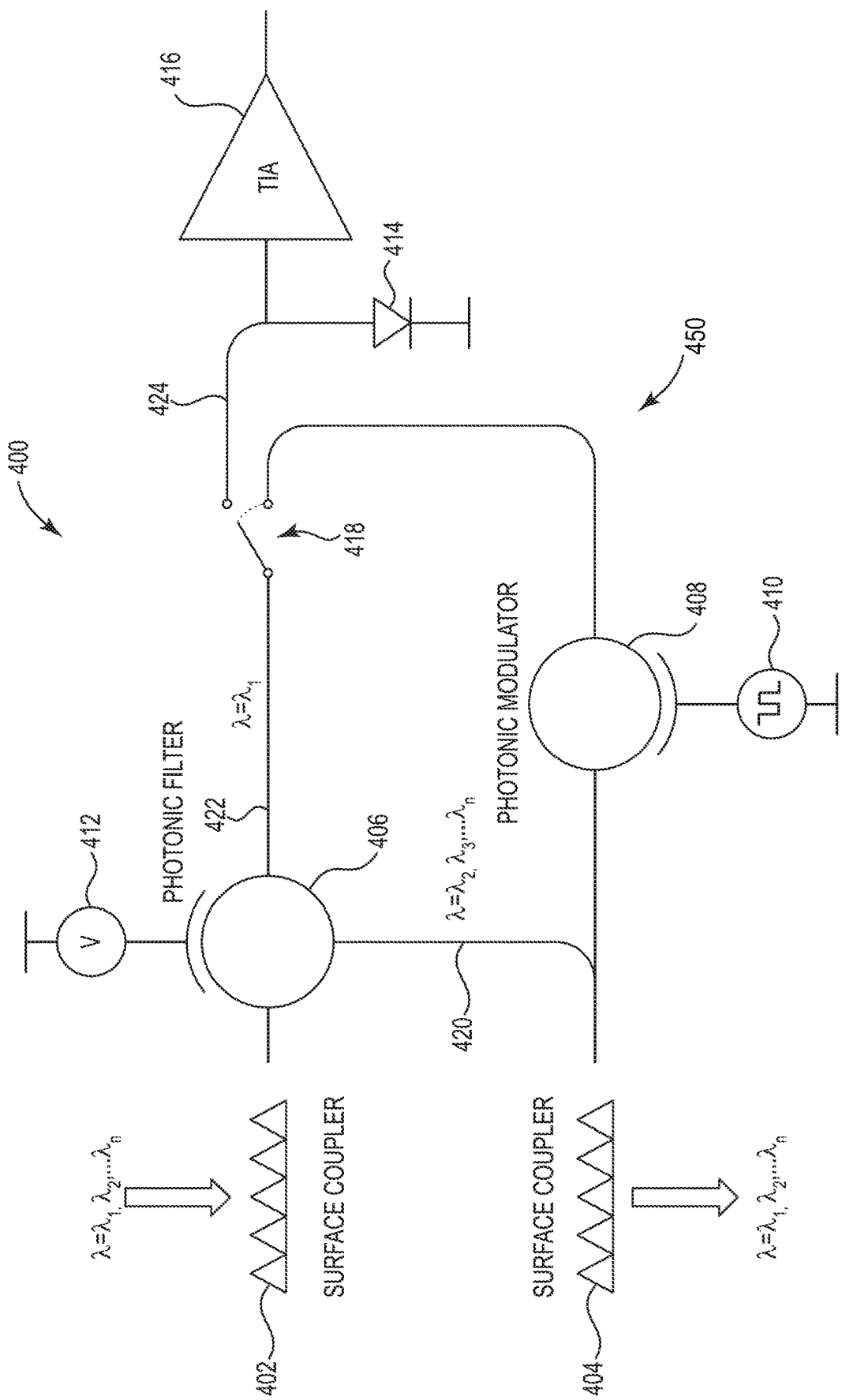
FIG. 4 is an illustration of a logic layer in accordance with an embodiment of the present disclosure.

FIG. 4 is an illustration of a logic layer 400 in accordance with an embodiment of the present disclosure. The logic layer 400 may be an example of one of the layer 116 of FIG. 1, but showing only a single photonic circuit 110. The logic layer 400 may include surface couplers 402 and 404 and a photonic circuit 450. While only one photonic circuit 450 is shown in FIG. 4, the number of photonic circuits is a non-limiting aspect of the present disclosure and as many photonic circuits as individual wavelengths may be included in the logic layer 400. Accordingly, an apparatus including the logic layer 400, such as the apparatus 100, may include a separate photonic circuit 450 for each layer/wavelength the apparatus may include. For example, if an apparatus includes N layers having an assigned wavelength, then the apparatus may include at least N photonic circuits 450. The surface couplers may be shared between all photonic circuits 450 included in the logic layer 400. The photonic circuit 440 includes a photonic filter 422, a photonic switch 418, a photodiode 414, a TIA 416, and a photonic modulator 408. Further, surface couplers 402 and 404 may be shared by a plurality of photonic circuits 450. The photonic circuit 450 includes many features and components previously discussed with regards to FIGS. 2 and 3, and for sake of brevity will not be described in detail with regards to FIG. 4. The photonic circuit 450 may receive photonic signals of wavelengths 1 through n, and either detect a photonic signal of an associated wavelength, or modulate and provide a photonic signal of the associated wavelength. In some embodiments, one or more of the photonic signals may pass through the photonic circuit 450 without being detected or modulated.

As discussed above, the surface couplers 402, 404 couple the photonic signals from or to a PTSV. For example, the surface coupler 402 may couple photonic signals from an inbound PTSV, such as the PTSV 104E of FIG. 1. In contrast, the surface coupler 404 may provide photonic signals to an outbound PTSV, such as the PTSV 122E of FIG. 1. Accordingly, the surface coupler 402 may couple photonic signals provided by one or more layers, such as the layers 114, and provide photonic signals to one or more layers, such as the layers 114.

The photonic filter 406 may be tuned to filter a photonic signal of an associated wavelength based on the voltage provided by voltage source 412. The unfiltered photonic signals may be provided to the surface coupler 404 by a path 420. In some embodiments, the unfiltered photonic signals may be provided to a subsequent photonic filter tuned to a different wavelength. The filtered photonic signal may be provided to the photonic switch 418 by the path 422. Switch 418 may be controlled to provide the filtered photonic signal to either the detector portion of the photonic circuit 450, e.g., the photodiode 414 and the TIA 416, or provide the filtered photonic signal to the photonic modulator 408. The switch 418 may be controlled based on whether a packet is incoming from a respective memory layer or whether a packet is to be provided to the respective memory layer, the respective memory layer being a memory layer associated with the wavelength 1. The control signal provided to the switch 418 may be based on an alert signal provided by a layer providing a packet, or based on an external command received. For example, if a layer 114 is providing a packet, then a signal alerting the logic layer 400 of such may be received, which may cause the switch 418 to couple the detector portion of the photonic circuit 400 to the output of the photonic filter 406. However, when the logic layer 400 provides a command packet, the logic layer 400 may cause the switch 418 to couple the output of the photonic filter 406 to an input of the photonic modulator 408.

When receiving data, the photodiode 414 may receive the filtered photonic signal through a photonic path 424, e.g., a waveguide, and convert the photonic signal to electrical signals, which may subsequently be amplified by the TIA

416. When providing a modulated photonic signal, e.g., a command packet, the photonic modulator 408 may modulate the filtered photonic signal in response to a modulation signal provided by a driver circuit 410. The driver circuit 410 may receive electrical signals from one or more circuits (not shown). The modulated photonic signal may be provided to the surface coupler 404.

Figure 5:
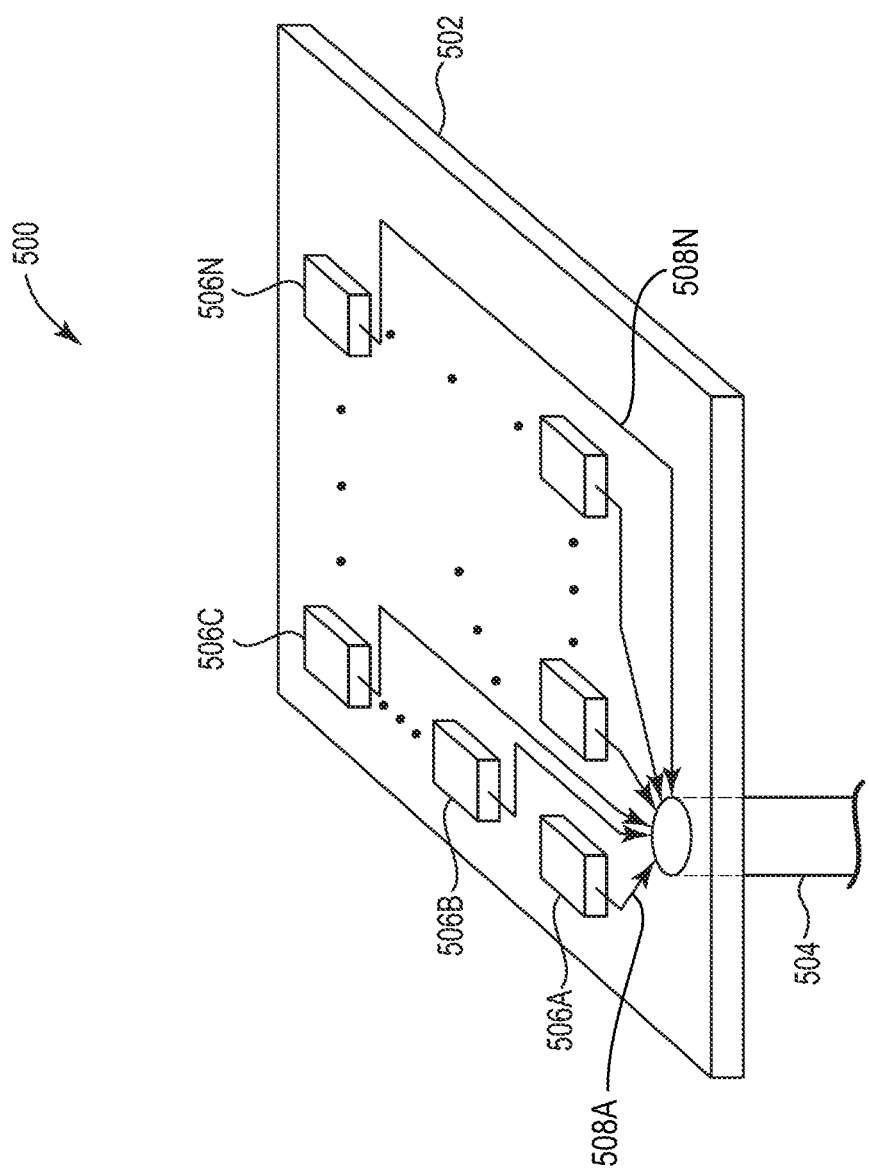
FIG. 5 is a block diagram of a photonic source layer in accordance with an embodiment of the present disclosure.

FIG. 5 is a block diagram of a photonic source layer 500 in accordance with an embodiment of the present disclosure. The photonic source layer 500 includes, but is not limited to, a plurality of photonic sources 506A through N (collectively referred to as the plurality of photonic sources 506), a substrate 502, and a PTSV 504. The layer 500 may be an example of the photonic source layer 112 of FIG. 1, and may provide photonic signals of N different wavelengths.

The substrate 502 may provide a base for the plurality of photonic sources 506, and may receive power (not shown) through electrical connections with one or more other layers, as shown in FIG. 1, and a package (not shown). The substrate 502 may be formed from organic or inorganic materials. For example, the substrate 502 may be formed from resins and polymers, or formed from silicon. The substrate 502 may be disposed as a layer in an apparatus, such as the apparatus 100, for providing one or more photonic sources for use in photonic communication paths.

The PTSV 504 may be a photonic channel, and may be formed from materials of different indexes of fraction. For example, a middle area, e.g., a core, of the PTSV may be formed from a material that has a higher index of refraction than a material forming an outer layer of the PTSV 504. The PTSV 504 may form a waveguide as is known in the art and internal reflections due to the change of index of refraction at the boundary between the core and the outer layer may prevent or reduce loss of photonic signals. The PTSV 504 may be coupled to each of the plurality of photonic sources 506 by a corresponding photonic coupler 508, which may be a waveguide formed in or on the substrate 502. The PTSV 504 may direct the photonic signals from each of the plurality of photonic sources to one or more other layers (not shown).

The layer 500 may include a separate optical coupling 508 for each of the plurality of photonic sources 506. For example, photonic source 506A may be coupled to the PTSV 504 by the optical coupling 508A. In some embodiments, each of the plurality of photonic couplings 508 may be formed from a single waveguide formed in the substrate 502.

The plurality of photonic sources 506 may provide a plurality of photonic signals of N different wavelengths. The difference in wavelengths between each of the plurality of photonic sources 506 may be enough so that each wavelength is filterable with respect to the others. Each of the plurality of photonic sources may be a fixed or tunable photonic source, configured to provide a photonic signal of a desired wavelength. In some embodiments, each of the plurality of photonic sources may be lasers. For example, each of the plurality of photonic sources may be vertical cavity surface emitting lasers (VCSELS).

The layer 500 may, while receiving power, continuously provide photonic signals from each of the plurality of photonic sources 506 to be used for photonic communication within a packaged device (packaging not show). Each source may be associated with a different layer so that the wavelengths of the photonic signals may be used to indicate a different layer of the device.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. An apparatus, comprising:
a photonic source layer;
a plurality of memory dice coupled to the photonic source layer, each of the plurality of memory dice including a photonic filter, a photonic modulator, and a photonic detector circuit,
the photonic filter of a die of the plurality of memory dice configured to receive a plurality of photonic signals of a plurality of wavelengths, respectively, and further configured to filter a photonic signal of the plurality of photonic signals of a wavelength of the plurality of wavelengths, and provide the filtered photonic signal to the photonic modulator of the die,
the photonic modulator of the die configured to modulate the filtered photonic signal,
the photonic detector circuit of the die or another die of the plurality of memory dice configured to receive the modulated photonic signal, and to detect and filter the modulated photonic signal or another modulated photonic signal associated with another photonic signal of the plurality of photonic signals, the photonic detector further configured to provide electrical signals responsive to the modulated photonic signal or the other modulated photonic signal, filtered by the photonic detector circuit; and
a logic die coupled to the plurality of memory dice.

2. The apparatus of claim 1, wherein each memory die of the plurality of memory dice is associated with and addressed by a respective wavelength of the plurality of wavelengths.

3. The apparatus of claim 1, wherein the logic die includes a plurality of photonic circuits configured to receive the plurality of modulated photonic signals,
wherein each photonic circuit of the plurality of photonic circuits is associated with a respective wavelength of the plurality of wavelengths, and
wherein the logic die includes a surface coupler configured to provide photonic signals to the plurality of memory dice responsive to the received modulated photonic signals.

4. The apparatus of claim 1, wherein the other die is further configured to detect and filter the other modulated photonic signal associated with the other photonic signal.

5. The apparatus of claim 1, wherein the other die is further configured to detect and filter the photonic signal received and modulated by the die.

6. The apparatus of claim 1, wherein the die comprises a photonic through substrate via (PTSV).

7. The apparatus of claim 1, wherein the photonic source layer comprises a plurality of photonic sources configured to provide the plurality of photonic signals, respectively, and
wherein each of the plurality of wavelengths is different.

8. The apparatus of claim 1, wherein the photonic filter of the die is configured to receive the plurality of photonic signals via a photonic through substrate via (PTSV), and wherein the PTSV forms a waveguide.

9. The apparatus of claim 1, wherein the photonic source layer comprises a plurality of photonic sources configured to provide the plurality of photonic signals, respectively, and
wherein each of the plurality of photonic sources is a laser.

10. The apparatus of claim 1, wherein the photonic filter of the die is a tunable photonic filter tuned to filter a photonic signal of a respective wavelength of the plurality of wavelengths.

11. An apparatus, comprising:
   a logic die;
   a plurality of memory dice including a first memory die and a second memory die, each of the plurality of memory dice including a photonic filter; and
   a plurality of photonic through substrate vias including:
      a first photonic through substrate via configured to provide a plurality of photonic signals of a plurality of wavelengths to the first memory die to the second die; and
      a second photonic through substrate via configured to provide the plurality of photonic signals of the plurality of wavelengths to the logic die,
   wherein the photonic filter of the second memory die is configured to:
      receive the plurality of photonic signals of the plurality of wavelengths from the first photonic through substrate via, respectively,
      filter a photonic signal of the plurality of photonic signals of a corresponding wavelength of the plurality of wavelengths, and
      provide the plurality of photonic signals of the plurality of photonic signals to the second photonic through substrate via.

12. The apparatus of claim 11, wherein each of the plurality of memory dice further comprises a photonic modulator, and
   wherein the photonic modulator of the first memory die is configured to modulate the filtered photonic signal and provide the modulated photonic signal to the first photonic through substrate via.

13. The apparatus of claim 12, wherein the logic die comprises a plurality of photonic circuits configured to receive the modulated photonic signal, and provide the received modulated photonic signal to the plurality of memory dice, and
   wherein each photonic circuit of the plurality of photonic circuits is associated with a respective wavelength of the plurality of wavelengths.

14. The apparatus of claim 11, wherein each of the plurality of memory dice further comprises a photonic detector circuit configured to receive the filtered photonic signal from the logic die, and provide an electrical signal responsive to the received filtered photonic signal when the filtered photonic signal is modulated.

15. The apparatus of claim 11, wherein the first memory die comprises:
   a surface coupler configured to couple the plurality of photonic signals of the plurality of wavelengths from the second photonic through substrate via to the photonic filter of the first memory die.

* * * * *